United States Patent

Chiang

[11] Patent Number: 6,139,192
[45] Date of Patent: Oct. 31, 2000

[54] BICYCLE AXLE

[76] Inventor: Douglas Chiang, 487, Ko-Chung Rd., Ta-Li City, Taichung Hsien, Taiwan

[21] Appl. No.: 09/358,387
[22] Filed: Jul. 21, 1999
[51] Int. Cl.$^7$ .................................................. F16C 9/02
[52] U.S. Cl. ........................................ 384/545; 384/458
[58] Field of Search ............................ 384/458, 457, 384/544, 545, 538; 74/594.1, 594.2

[56] References Cited

U.S. PATENT DOCUMENTS

| | | | |
|---|---|---|---|
| 4,545,691 | 10/1985 | Kastan et al. | 384/458 |
| 5,437,510 | 8/1995 | Jeng | 384/538 |
| 5,496,114 | 3/1996 | Lin | 384/458 |
| 5,549,396 | 8/1996 | Chiang | 384/545 |
| 5,690,432 | 11/1997 | Lin et al. | 384/545 |
| 5,813,770 | 9/1998 | Chiang | 384/545 |
| 5,984,528 | 11/1999 | Ohtsu | 384/545 |

*Primary Examiner*—Thomas R. Hannon
*Attorney, Agent, or Firm*—Bacon & Thomas, PLLC

[57] ABSTRACT

A bicycle axle comprises a shaft on which two fastening seats are mounted with, one of the two fastening seats is provided with inner threads and the other one the two fastening seats being provided with a tapered inner wall cooperating with a tapered outer wall of a fastening piece. The five-way tube of the bicycle frame is securely fastened between the two fastening seats.

1 Claim, 4 Drawing Sheets

BICYCLE AXLE

FIELD OF THE INVENTION

The present invention relates generally to a bicycle, and more particularly to an axle of the bicycle.

BACKGROUND OF THE INVENTION

The conventional bicycle axles are generally rather complicated in construction and comprise a number of component parts which are susceptible to wear or jamming. In other words, the conventional bicycle axles are neither efficient nor cost-effective.

DESCRIPTION OF PRIOR ART

U.S. Pat. No. 5,549,396, issued on Aug. 27, 1996, to the same applicant discloses a bicycle crank axle in which two fitting shafts are located respectively at both ends thereof. One of the two fitting shafts is provided with a stopping block while another one of the two fitting shafts is provided with a threaded portion. Two fitting shafts are fitted respectively into a tapered sleeve engageable with a tapered bearing which is fastened with a tapered fixation seat. However, such combination is still regarded as complicated in assembling, and has low fit precision.

SUMMARY OF THE INVENTION

The primary objective of the present invention is to provide an improved bicycle axle which is relatively simple in construction.

It is another objective of the present invention to provide an improved bicycle axle which can be assembled with ease and precision.

It is still another objective of the present invention to provide an improved bicycle axle which can be made economically.

The objectives, feature, functions, and advantages of the present invention will be readily understood from the following detailed description of a preferred embodiment of the present invention and with reference to the accompanying drawings.

DETAILED DESCRIPTION OF PREFERRED EMBODIMENT

Figure 1:
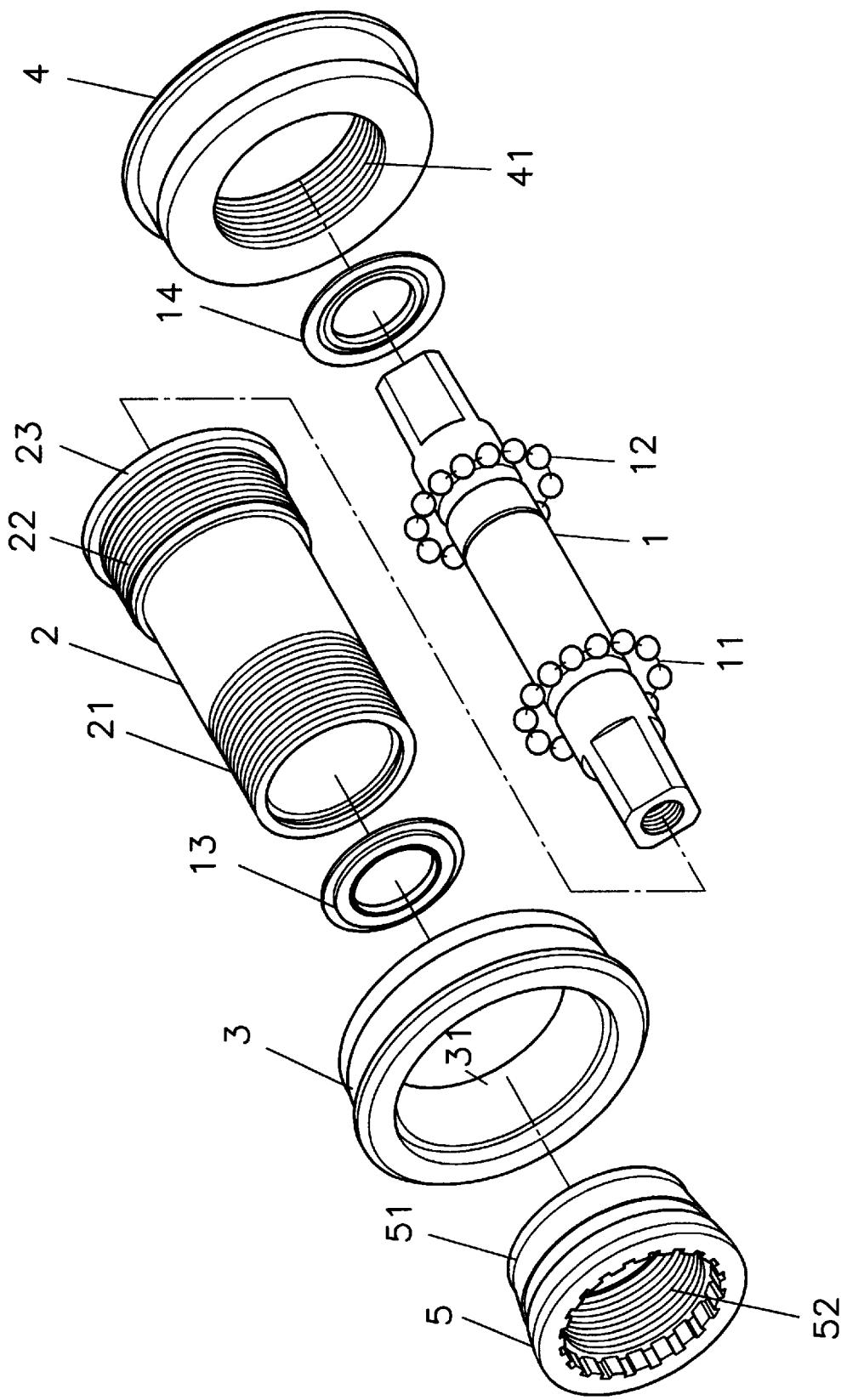
FIG. 1 shows an exploded view of the preferred embodiment of the present invention.
Figure 2:
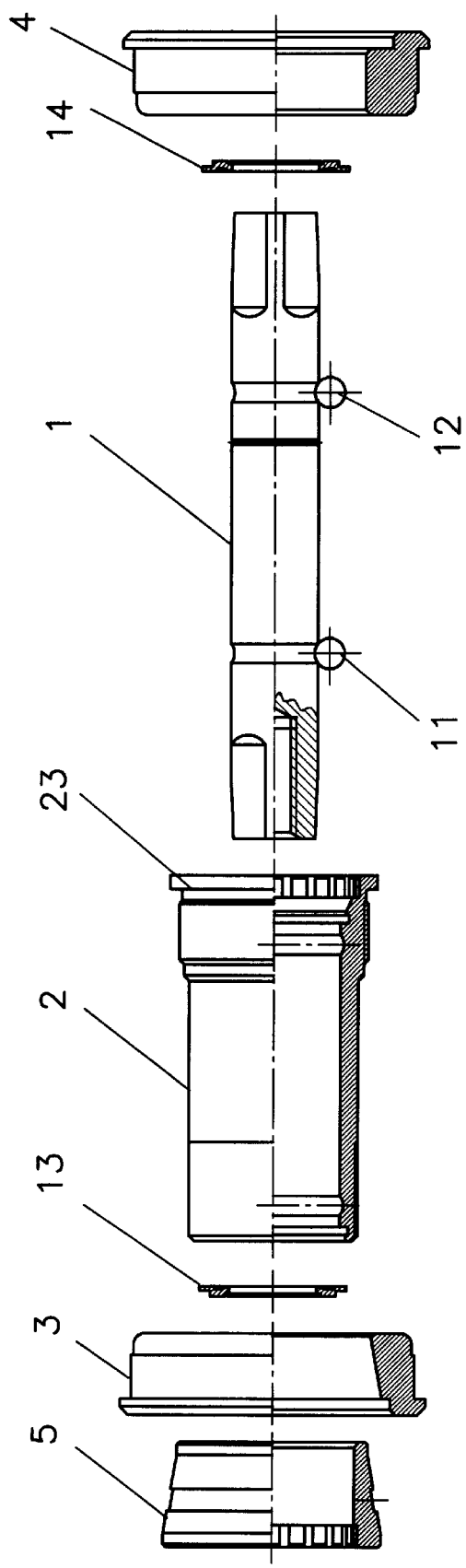
FIG. 2 shows a sectional exploded view of the preferred embodiment of the present invention.

As shown in FIGS. 1 and 2, a bicycle axle embodied in the present invention comprises a shaft 1 which is respectively provided at both ends thereof with rolling balls 11 and 12, and two oil rings 13 and 14. The shaft 1 is further provided at the outer end thereof with a tapered sleeve 2 which has two threaded ends 21 and 22 The tapered end 22 is provided in the inner edge thereof with a recessed key tooth, and in the outer edge thereof with a flange 23. The left end 21 and the right end 22 of the sleeve 2 are respectively fitted into a left fastening seat 3 and a right fastening seat 4 which is provided with inner threads 41 which are engaged with the outer threads of the right end 22. The left fastening seat 3 has a tapered inner wall 31 which cooperates with a tapered outer wall 51 of a fastening piece 5. The fastening piece 5 is provided with inner thread 52, which are engaged with the outer threads of the left end 21 of the sleeve 2. The present invention is characterized by the fastening piece 5 and the fastening seat 3, which eliminate many component part of the corresponding structure of the prior art without undermining the overall function of the axle of the present invention.

Figure 3:
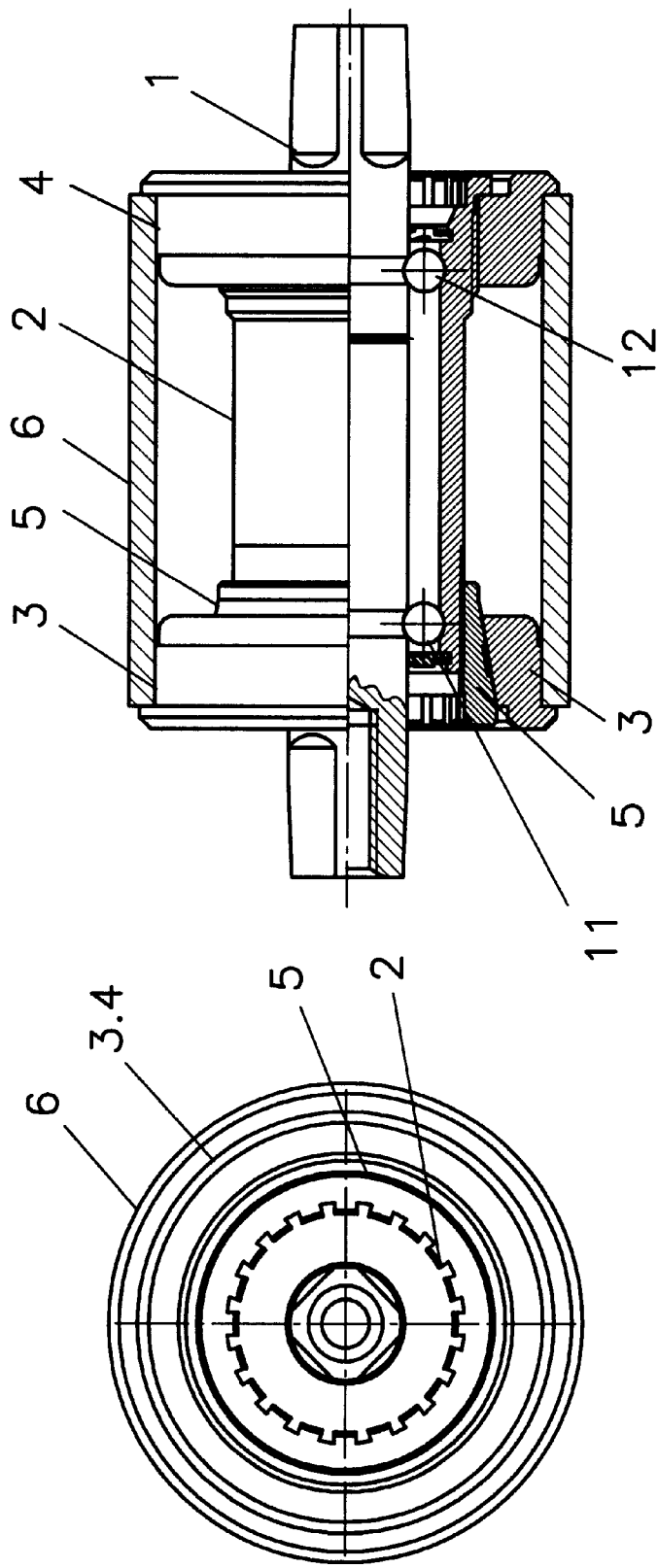
FIG. 3 shows sectional views of the preferred embodiment of the present invention in combination.
Figure 4:
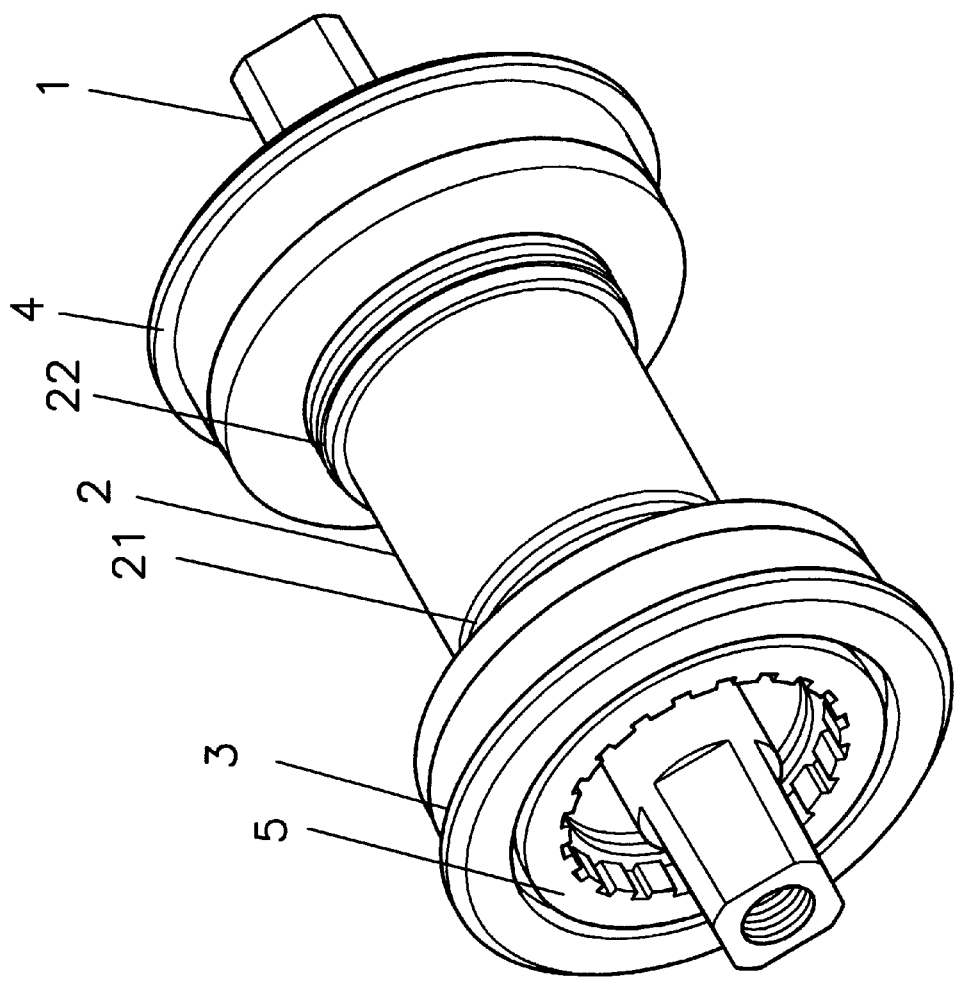
FIG. 4 shows a perspective view of the preferred embodiment of the present invention in combination.

As shown in FIGS. 3 and 4, the present invention is mounted on two ends of a five-way tube such that the inner threads 41 of the fastening seat 4 are engaged with the right end 22 of the sleeve 2, and that the tapered inner wall 31 of the fastening seat 3 cooperates with the tapered outer wall 51 of the fastening piece 5, and further that the inner threads 52 of the fastening piece 5 are engaged with the left end 21 the sleeve 2. In light of the fastening seat 3 being movably engaged with the fastening piece 5, the present invention is not susceptible to wear and jam. In addition, the present invention is simple in construction and is therefore cost-effective.

The movable engagement of the left fastening seat 3 with fastening piece 5 enables the large or the small five-way tube 6 to be fastened securely between the left fastening seat 3 and the right fastening seat 4.

What is claimed is:

1. A bicycle axle comprising a shaft provided at both ends thereof with a plurality of rolling balls, and two oil rings whereby said shaft is further provided at an outer end thereof with a tapered sleeve which is provided with two threaded ends, one of said two threaded ends provided in the inner wall thereof with a recessed key tooth and a flange, said axle further comprising two fastening seats, with one of said two fastening seats being fastened with one end of said sleeve, and with the other one of said two fastening seats being movably engaged with a fastening piece having a tapered outer wall cooperating with a tapered inner wall of the other one of said two fastening seats, said fastening piece further having inner threads whereby said fastening piece is fastened with the other end of said sleeve such that said inner threads of said fastening piece are engaged with the outer threads of the other end of said sleeve.

* * * * *